United States Patent
Bowman et al.

(10) Patent No.: US 6,400,580 B1
(45) Date of Patent: Jun. 4, 2002

(54) SYSTEM AND METHOD FOR REDUCING A DC MAGNETIC FLUX BIAS IN A TRANSFORMER AND POWER CONVERTER EMPLOYING THE SAME

(76) Inventors: Wayne C. Bowman, 5 Oxford Place, Allen, TX (US) 75002; Mark E. Jacobs, 7615 Applecross La., Dallas, TX (US) 75248; Allen F. Rozman, 2901 Wyndham La., Richardson, TX (US) 75082

( * ) Notice: Subject to any disclaimer, the term of this patent is extended or adjusted under 35 U.S.C. 154(b) by 0 days.

(21) Appl. No.: 09/685,540

(22) Filed: Oct. 10, 2000

(51) Int. Cl.$^7$ ............................................. H02M 3/335
(52) U.S. Cl. ............................ 363/17; 363/98; 363/132
(58) Field of Search ........................... 363/17, 89, 84, 363/95, 98, 131, 132, 135, 136

(56) References Cited

U.S. PATENT DOCUMENTS

| | | | |
|---|---|---|---|
| 4,847,554 A | * 7/1989 | Goodwin | 324/127 |
| 4,899,271 A | 2/1990 | Seiersen | 363/126 |
| 5,047,911 A | * 9/1991 | Sperzel et al. | 363/56 |
| 5,220,492 A | * 6/1993 | Rubin et al. | 363/21 |
| 5,274,543 A | 12/1993 | Loftus, Jr. | 363/127 |
| 5,291,382 A | 3/1994 | Cohen | 363/16 |
| 5,303,138 A | 4/1994 | Rozman | 363/21 |
| 5,434,768 A | 7/1995 | Jitaru et al. | 363/21 |
| 5,528,482 A | 6/1996 | Rozman | 363/21 |
| 5,541,828 A | 7/1996 | Rozman | 363/21 |
| 5,590,032 A | 12/1996 | Bowman et al. | 363/15 |
| 5,625,541 A | 4/1997 | Rozman | 363/21 |
| 5,870,299 A | 2/1999 | Rozman | 363/21 |
| 5,920,475 A | 7/1999 | Boylan et al. | 363/127 |
| 5,940,287 A | 8/1999 | Brkovic | 363/127 |
| 5,956,245 A | 9/1999 | Rozman | 363/89 |
| 6,002,597 A | 12/1999 | Rozman | 363/21 |
| 6,011,703 A | 1/2000 | Boylan et al. | 363/21 |
| RE36,571 E | 2/2000 | Rozman | 363/21 |
| 6,038,154 A | 3/2000 | Boylan et al. | 363/127 |
| 6,069,799 A | 5/2000 | Bowman et al. | 363/20 |
| 6,091,616 A | 7/2000 | Jacobs et al. | 363/127 |
| 6,191,676 B1 | * 2/2001 | Gabor | 336/160 |

OTHER PUBLICATIONS

"Current Mode Control of a Full Bridge DC–to–DC Converter with a Two Inductor Rectifier" by Nasser H. Kutkut and Glen Luckjiff; 1997 IEEE; pp. 203–209.

"Coupled–Inductor Current–Doubler Topology in Phase–Shifted Full–Bridge DC–DC Converter" by A. Pietkiewicz and D. Tollik; 1998 IEEE; pp. 41–48.

U.S. Patent Application, Serial No. 09/374,217 to Boylan, et al., entitled "System and Method for Determining Output Current and Converter Employing the Same" dated Aug. 13, 1999.

U.S. Patent Application, Serial No. 09/518,527 to Jacobs, entitled "Method and Apparatus for Dynamically Altering Operation of a Converter Device to Improve Conversion Efficiency" dated Mar. 4, 2000.

U.S. Patent Application, Serial No. 09/638,183 to Jacobs, et al., entitled "System and Method for Improving Control Loop Response of a Power Supply" dated Jul. 31, 2000.

* cited by examiner

*Primary Examiner*—Adolf Deneke Berhane (57) ABSTRACT

A system and method for reducing a DC magnetic flux bias in a transformer and a power converter employing the system or the method. The power converter has a full bridge switching circuit coupled across a primary winding of a transformer and a hybridge rectifier circuit coupled across a secondary winding of the transformer. The transformer is subject to the DC magnetic flux bias as a result of an imbalance in the hybridge rectifier circuit. In one embodiment, the system includes: (1) a sensor configured to develop a signal representing the DC magnetic flux bias in the transformer; and (2) a controller, coupled to the sensor, configured to operate the full bridge switching circuit as a function of the signal thereby to reduce the DC magnetic flux bias.

24 Claims, 6 Drawing Sheets

SYSTEM AND METHOD FOR REDUCING A DC MAGNETIC FLUX BIAS IN A TRANSFORMER AND POWER CONVERTER EMPLOYING THE SAME

CROSS-REFERENCE TO RELATED APPLICATIONS AND PATENTS

This application is related to the following U.S. patents and

| Reference No. | Title | Inventor(s) | Date |
|---|---|---|---|
| 09/374,217 ('217 application) | System and Method for Determining Output Current and Converter Employing the Same | Boylan, et al. | Aug. 13, 1999 |
| 09/518,527 ('527 application) | Method and Apparatus for Dynamically Altering Operation of a Converter Device to Improve Conversion Efficiency | Jacobs | March 4, 2000 |
| 09/638,183 ('183 application) | System and Method for Improving Control Loop Response of a Power Supply | Jacobs, et al. | July 31, 2000 |
| 4,899,271 ('271 patent) | Power Supply Circuit | Seiersen | Feb. 6, 1990 |
| 5,274,543 ('543 patent) | Zero-Voltage Switching Power Converter with Lossless Synchronous Rectifier Gate Drive | Loftus | Dec. 28, 1993 |
| 5,291,382 ('382 patent) | Pulse Width Modulated DC/DC Converter with Reduced Ripple Current Component Stress and Zero Voltage Switching Capability | Cohen | March 1, 1994 |
| 5,303,138 ('138 patent) | Low Loss Synchronous Rectifier for Application to Clamped-Mode Power Converters | Rozman | April 12, 1994 |
| 5,434,768 ('768 patent) | Fixed Frequency Converter Switching at Zero Voltage | Jitaru, et al. | July 18, 1995 |
| 5,528,482 ('482 patent) | Low Loss Synchronous Rectifier for Application to Clamped-Mode Power Converters | Rozman | June 18, 1996 |
| 5,541,828 ('828 patent) | Multiple Output Converter with Continuous Power Transfer to an Output and with Multiple Output Regulation | Rozman | July 30, 1996 |
| 5,590,032 ('032 patent) | Self-Synchronized Drive Circuit for a Synchronous Rectifier in a Clamped-Mode Power Converter | Bowman, et al. | Dec. 31, 1996 |
| 5,625,541 ('541 patent) | Low Loss Synchronous Rectifier for Application to Clamped-Mode Power Converters | Rozman | April 29, 1997 |
| 5,870,299 ('299 patent) | Method and Apparatus for Damping Ringing in Self-driven Synchronous Rectifiers | Rozman | Feb. 9, 1999 |
| 5,920,475 ('475 patent) | Circuit and Method for Controlling a Synchronous Rectifier Converter | Boylan, et al. | July 6, 1999 |
| 5,940,287 ('287 patent) | Controller for a Synchronous Rectifier and Power Converter Employing the same | Brkovic | Aug. 17, 1999 |
| 5,956,245 ('245 patent) | Circuit and Method for Controlling a Synchronous Rectifier Converter | Rozman | Sept. 21, 1999 |
| 6,002,597 ('597 patent) | Synchronous Rectifier having Dynamically Adjustable Current Rating and Method of Operation Thereof | Rozman | Dec. 14, 1999 |
| 6,011,703 ('703 patent) | Self-synchronized Gate Drive for Power Converter Employing Self-driven Synchronous Rectifier and Method of Operation Thereof | Boylan, et al. | Jan. 4, 2000 |
| RE 36,571 ('571 patent) | Low Loss Synchronous Rectifier for Application to Clamped-mode Power Converters | Rozman | Feb. 15, 2000 |
| 6,038,154 ('154 patent) | Circuit and Method for Controlling a Synchronous Rectifier Converter | Boylan, et al. | March 14, 2000 |
| 6,069,799 ('799 patent) | Self-Synchronized Drive Circuit for a Synchronous Rectifier in a Clamped-Mode Power Converter | Bowman, et al. | May 30, 2000 |
| 6,091,616 ('616 patent) | Drive Compensation Circuit for Synchronous Rectifier and Method of Operating the Same | Jacobs, et al. | July 18, 2000 |

The above-listed applications are commonly assigned with the present invention. The above-listed applications and patents are incorporated herein by reference as if reproduced herein in their entirety.

TECHNICAL FIELD OF THE INVENTION

The present invention is directed, in general, to power conversion and, more specifically, to a system and method for reducing a DC magnetic flux bias in a transformer and a power converter employing the system or the method.

BACKGROUND OF THE INVENTION

A power converter is a power processing circuit that converts an input voltage waveform into a specified output voltage waveform. Power converters are typically employed in applications that require conversion of an input DC voltage to various other DC voltages, higher or lower than the input DC voltage. Exemplary applications for power converters include telecommunication and computer systems wherein high voltages are converted to lower voltages to operate the systems.

Current power converter designs often employ a full bridge inverter having four controllable switches (e.g., power metal-oxide semiconductor field-effect transistors), a transformer (e.g., an isolation transformer), an output rectifier and an output filter. A controller is included and employed to control the controllable switches.

A conventional full bridge inverter generally operates as follows. The controllable switches are arranged in two diagonal pairs that are alternately turned on for a portion of a switching period to apply opposite polarities of the input DC voltage across a primary winding of the transformer. The controllable switches thus operate to convert the input DC voltage into an AC voltage required to operate the transformer. Between conduction intervals of the diagonal pairs, all of the controllable switches are turned off for a fraction of the switching period. Ideally, this should result in a voltage across the primary winding of the transformer being substantially zero.

The output rectifier then rectifies the AC voltage from a secondary winding of the transformer. A rectified voltage of the transformer should, therefore, ideally be a square wave with an average value proportional to a duty ratio of the diagonal pairs of the controllable switches. The output filter smooths and filters the rectified voltage to provide a substantially constant output voltage at the output of the power converter. The controller monitors the output voltage and adjusts the duty ratio of the diagonal pairs of the controllable switches to maintain the output voltage at a constant level as the input DC voltage and the load current vary. Alternatively, the controller may monitor the output current and adjust the duty ratio of the diagonal pairs of the controllable switches to maintain the output current at a substantially constant level as the input DC voltage and the load impedance vary.

The transformer may sustain a DC magnetic flux bias as a result of a volt-second imbalance caused by inaccuracies in the control system. A volt-second imbalance between the two half-cycles of each switching cycle implies that a DC voltage component is applied to a core of the transformer. There are several potential causes of the volt-second imbalance including, for instance, an imbalance in the duty cycles of the controllable switches or a small asymmetry in the voltage drops across the controllable switches. Over a number of switching cycles, the continuing increase in the magnetic flux may cause the core of the transformer to saturate, resulting in failure of the power converter employing the transformer.

The transformer may further sustain the DC magnetic flux bias as a result of a physical implementation of a circuit topology, such as an output rectifier topology. In low voltage systems, a hybridge or current-doubler rectifier topology may prove useful. The hybridge rectifier generally includes first and second inductors coupled in series across the secondary winding of the transformer. Unequal resistances of the first and second inductors may result in an unequal division of current between the first and second inductors. A net DC bias may result, with a DC bias voltage (obtained from one end of the first inductor to an opposite end of the second inductor) applied directly across the secondary winding of the transformer. The secondary winding typically has a low resistance, often in the order of milliohms. A difference in the order of millivolts between the first and second inductors, coupled with the low resistance of the secondary winding, may result in amperes of DC current flowing in the secondary winding.

It is therefore advantageous to reduce the DC magnetic flux bias in the transformer to avoid saturation of the core. One common approach to reducing an effect of the DC magnetic flux bias on the transformer is to provide a gap in the core of the transformer. The gap will decrease the magnetizing inductance of the transformer, resulting in an increase in the current flowing in the magnetizing inductance (magnetizing current). The transformer may thus be more tolerant to the DC magnetic flux bias. Interaction of the increased magnetizing current with other currents flowing in the windings of the transformer may increase a power loss in the windings, which may be observed as an increase in an AC resistance of the windings. To reduce the power loss in the windings of the transformer, it may be advantageous to reduce the gap in the core of the transformer. A smaller gap, however, is necessarily more sensitive to the effects of the DC magnetic flux bias.

Accordingly, what is needed in the art is a system and method for reducing a DC magnetic flux bias in a power converter employing a transformer that overcomes the deficiencies of the prior art.

SUMMARY OF THE INVENTION

To address the above-discussed deficiencies of the prior art, the present invention provides a system and method for reducing a DC magnetic flux bias in a transformer and a power converter employing the system or the method. The power converter has a full bridge switching circuit coupled across a primary winding of a transformer and a hybridge rectifier circuit coupled across a secondary winding of the transformer. The transformer is subject to the DC magnetic flux bias as a result of an imbalance in the hybridge rectifier circuit. In one embodiment, the system includes: (1) a sensor configured to develop a signal representing the DC magnetic flux bias in the transformer; and (2) a controller, coupled to the sensor, configured to operate the full bridge switching circuit as a function of the signal thereby to reduce the DC magnetic flux bias.

The present invention, in one aspect, provides a system and method for reducing a DC magnetic flux bias in a transformer of a power converter employing a full bridge switching circuit and a hybridge rectifier circuit. By reducing the DC magnetic flux bias, failure of the power converter due to saturation of a core of the transformer may be avoided.

In one embodiment of the present invention, the sensor includes an integrating differential operational amplifier. The operational amplifier may have resistive inputs coupled across the secondary winding of the transformer. In an alternative embodiment, the sensor includes a first series-coupled resistor and capacitor coupled to an inductor of the hybridge rectifier circuit. The sensor may further include a second series-coupled resistor and capacitor coupled to a second inductor of the hybridge rectifier circuit. The capacitors may be coupled to a stable point. In either case, the signal developed by the sensor may be a function of a magnetic flux in the transformer. By observing the excursions of the magnetic flux in the transformer, the DC magnetic flux bias may be determined and controlled.

In another embodiment of the present invention, the sensor includes a sense resistor coupled in series with the secondary winding. The sense resistor is configured to sense a DC current in the secondary winding. The sensor may thus develop the signal based on the DC current.

In yet another embodiment of the present invention, the sensor includes first and second sense resistors respectively coupled to first and second inductors of the hybridge rectifier circuit. The first and second sense resistors are configured to sense DC currents in the first and second inductors, respectively. The sensor may thus develop the signal based on a difference between the DC currents in the first and second inductors.

In one embodiment of the present invention, the controller is configured to adjust a duty cycle of controllable switches associated with the full bridge switching circuit. By adjusting a duty cycle of one controllable switch relative to another controllable switch, the DC magnetic flux bias may be reduced. In a related embodiment, the controller is configured to reduce a difference between a positive excursion and a negative excursion of a magnetic flux in the transformer. Reducing the difference between the positive and negative excursions reduces the DC bias in the magnetic flux. In another embodiment, the controller employs the signal to terminate a duty cycle of a controllable switch associated with the full bridge switching circuit. Terminating the duty cycle of the controllable switch at an appropriate time may prevent an excursion of the magnetic flux from exceeding a saturation flux of the transformer.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
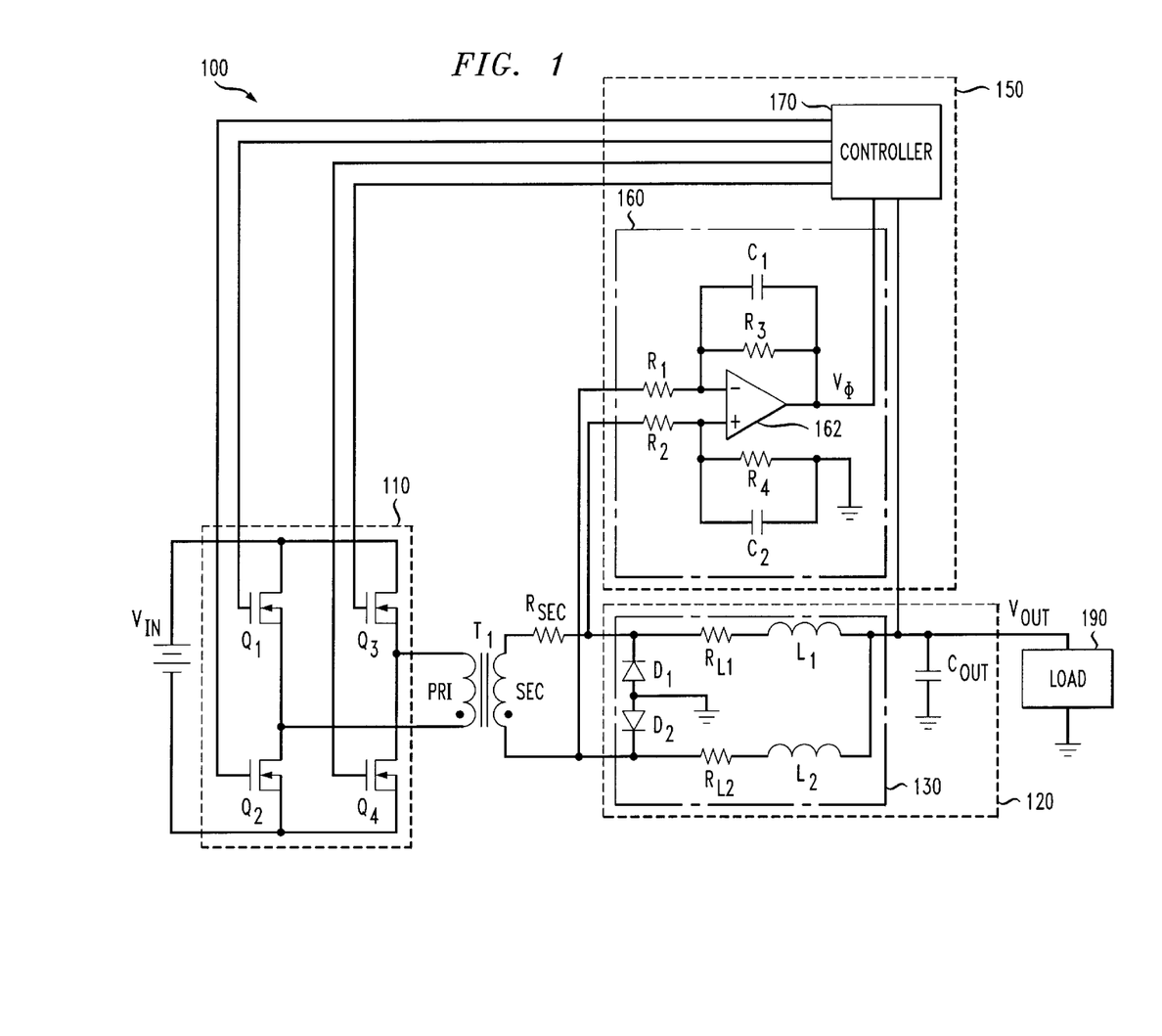
FIG. 1 illustrates a schematic diagram of an embodiment of a power converter constructed in accordance with the principles of the present invention.

Referring initially to FIG. 1, illustrated is a schematic diagram of an embodiment of a power converter 100 constructed in accordance with the principles of the present invention. The power converter 100 includes a full bridge switching circuit 110, having first, second, third and fourth controllable switches $Q_1$, $Q_2$, $Q_3$, $Q_4$, coupled to a primary winding PRI of a transformer $T_1$. In the illustrated embodiment, the transformer $T_1$, is an isolation transformer. Of course, the transformer associated with the power converter of the present invention need not be an isolation transformer. The first, second, third and fourth controllable switches $Q_1$, $Q_2$, $Q_3$, $Q_4$ are intermittently switched to apply a DC input voltage $V_{IN}$, with alternating polarity, across the primary winding PRI. Those skilled in the art are familiar with the various operating modes of the full bridge switching circuit 110, including a conventional and a phase-shifted mode of operation.

The power converter 100 further includes an output stage 120, coupled across a secondary winding SEC of the transformer $T_1$, that provides an output voltage $V_{OUT}$ to a load 190. The output stage 120 includes a hybridge rectifier circuit 130 coupled to the secondary winding SEC and an output filter (output capacitor $C_{OUT}$) coupled to the hybridge rectifier circuit 130. In the illustrated embodiment, the hybridge rectifier circuit 130 includes first and second rectifying diodes $D_1$, $D_2$ coupled across the secondary winding SEC. The hybridge rectifier circuit 130 further includes first and second inductors $L_1$, $L_2$ coupled in series across the secondary winding SEC. The first and second inductors $L_1$, $L_2$ have first and second intrinsic resistances $R_{L1}$, $R_{L2}$, respectively, which may include resistances of the circuit wiring associated with the first and second inductors $L_1$, $L_2$.

A core of the transformer $T_1$ is subject to saturation due to a DC magnetic flux bias resulting from, among other things, a difference in the first and second intrinsic resistances $R_{L1}$, $R_{L2}$ of the first and second inductors $L_1$, $L_2$. Unequal intrinsic resistances $R_{L1}$, $R_{L2}$ may result in an unequal division of current between the first and second inductors $L_1$, $L_2$. A first DC voltage drop across the first intrinsic resistance $R_{L1}$ may be unequal to a second DC voltage drop across the second intrinsic resistance $RL_2$, resulting in a DC bias voltage that is applied directly across the secondary winding SEC. Since the transformer $T_1$ is unable to transmit a DC signal between the primary and secondary windings PRI, SEC, the DC bias voltage may cause the magnetic flux to exhibit a DC bias. The power converter 100, therefore, advantageously includes a system 150 for reducing the DC magnetic flux bias in the transformer $T_1$ to thereby prevent saturation of the core of the transformer $T_1$.

In the illustrated embodiment, the system 150 includes a sensor 160 that develops a signal (bias signal VΦ) representing a DC bias voltage across the secondary winding SEC resulting from current flowing through an intrinsic resistance Rsec of the secondary winding SEC. The system 150 further includes a controller 170, coupled to the sensor 160, that operates the full bridge switching circuit 110 as a function of the bias signal VΦ thereby to reduce the DC magnetic flux bias.

The sensor 160 includes an operational amplifier 162 and its associated components. In the illustrated embodiment, the sensor includes first and second input resistors $R_1$, $R_2$ coupled to the operational amplifier 162. The first and second input resistors $R_1$, $R_2$ form a differential resistive input for the operational amplifier 162. The differential resistive input is coupled across the secondary winding SEC to observe the DC bias voltage. The DC bias voltage in this case is a result of current flowing through the intrinsic resistance Rsec of the secondary winding SEC. The sensor 160 further includes first and second capacitors $C_1$, $C_2$ coupled to the operational amplifier 162. The configuration of the first and second capacitors $C_1$, $C_2$ allows the operational amplifier 162 to function as an integrator. The sensor 160 further includes third and fourth resistors $R_3$, $R_4$ coupled to the operational amplifier 162. The third and fourth resistors $R_3$, $R_4$ are employed to provide a feedback signal to stabilize the operational amplifier 162. The sensor 160 is thus an integrating differential operational amplifier.

The sensor 160 monitors a voltage across the secondary winding SEC and develops therefrom the bias signal VΦ. A bias in the magnetic flux in the transformer $T_1$ due to the application of a DC component to the primary or secondary windings PRI, SEC may be observable in the bias signal V$\Phi$. The bias signal V$\Phi$ is therefore a function of a time-varying magnetic flux in the transformer T$_1$. A method of measuring the DC current flowing in the secondary winding SEC is disclosed in the '287 patent to Brkovic.

The controller 170 monitors the output voltage V$_{OUT}$ and adjusts the duty cycles of the first, second, third and fourth controllable switches Q$_1$, Q$_2$, Q$_3$, Q$_4$ accordingly to regulate the output voltage V$_{OUT}$. In the illustrated embodiment, the controller 170 is coupled to the sensor 160 and receives the bias signal V$\Phi$ therefrom. The controller 170 may adjust duty cycles of the first, second, third and fourth controllable switches Q$_1$, Q$_2$, Q$_3$, Q$_4$ to reduce the DC magnetic flux bias in the core of the transformer T$_1$.

For example, in a conventional (hard-switched) mode of operation, the first and fourth controllable switches Q$_1$, Q$_4$ form a first diagonal pair and the second and third controllable switches Q$_2$, Q$_3$ form a second diagonal pair. The controller 170 may adjust a duty cycle of the first diagonal pair with respect to a duty cycle of the second diagonal pair to develop a corrective voltage that is applied to the primary winding PRI of the transformer T$_1$ to counteract with the observed DC magnetic flux bias, resulting in a reduction in the DC magnetic flux bias.

Figure 2:
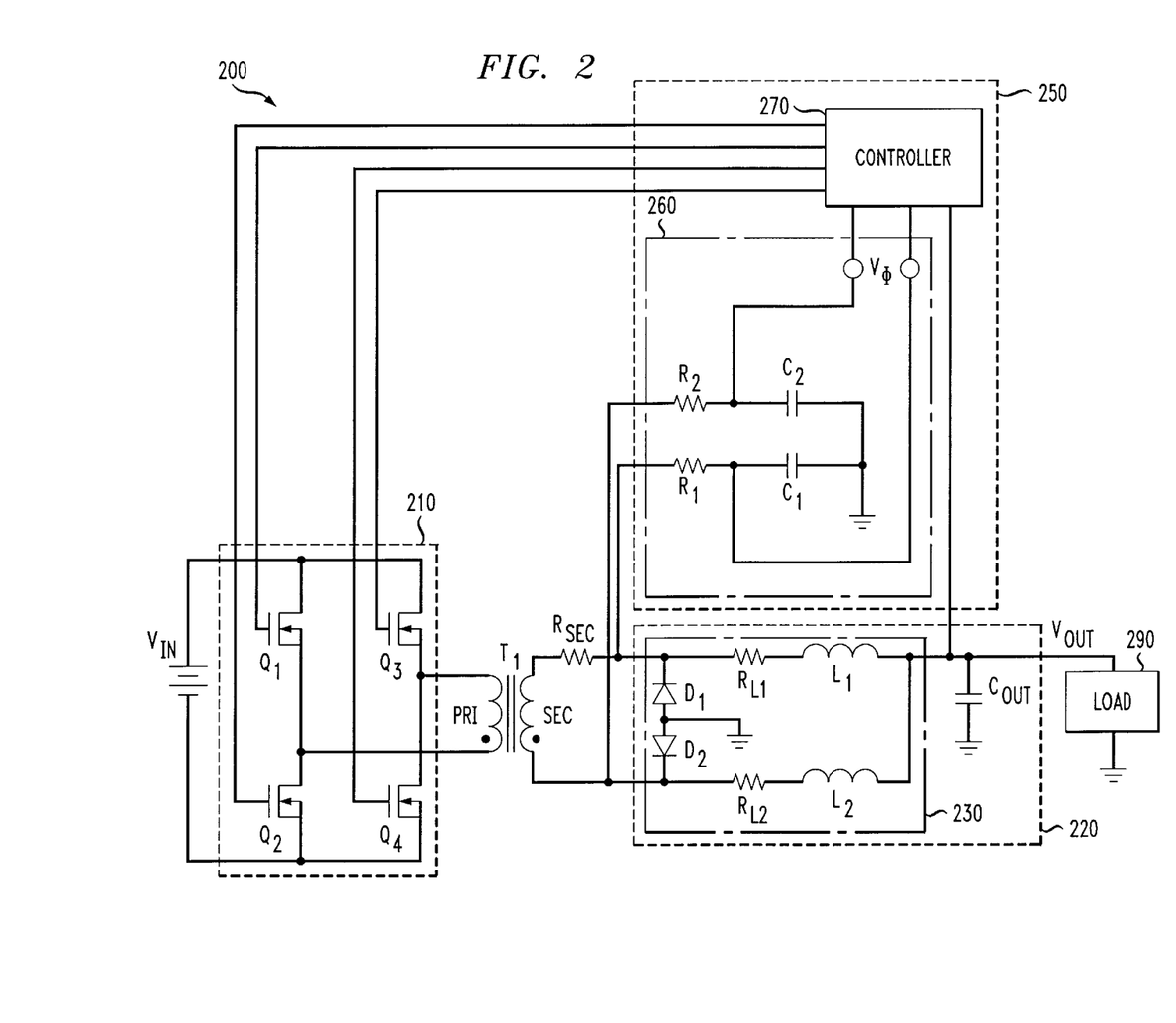
FIG. 2 illustrates a schematic diagram of another embodiment of a power converter constructed in accordance with the principles of the present invention.

Turning now to FIG. 2, illustrated is a schematic diagram of another embodiment of a power converter 200 constructed in accordance with the principles of the present invention. The power converter 200 includes a full bridge switching circuit 210 coupled to a primary winding PRI of a transformer T$_1$ The full bridge switching circuit 210 intermittently switches to apply a DC input voltage V$_{IN}$, with alternating polarity, across the primary winding PRI. The power converter 200 further includes an output stage 220 coupled across a secondary winding SEC of the transformer T$_1$. The output stage 220, including a hybridge rectifier circuit 230 and an output capacitor C$_{OUT}$, provides an output voltage V$_{OUT}$ to a load 290 coupled to an output of the power converter 200. The full bridge switching circuit 210 and the output stage 220 are substantially similar to the full bridge switching circuit 110 and the output stage 120 illustrated and described with respect to FIG. 1 and, as a result, will not hereinafter be further described.

The power converter 200 further includes a system 250 for reducing a DC magnetic flux bias in the transformer T$_1$ to thereby prevent saturation of a core of the transformer T$_1$. In the illustrated embodiment, the system 250 includes a sensor 260 that develops a signal (bias signal V$\Phi$) representing a DC bias voltage across the secondary winding SEC. The system 250 further includes a controller 270, coupled to the sensor 260, that operates the full bridge switching circuit 210 as a function of the bias signal V$\Phi$ thereby to reduce the DC magnetic flux bias. The controller 270 is similar to the controller 170 illustrated and described with respect to FIG. 1 and, as a result, will not hereinafter be further described.

In the illustrated embodiment, the sensor 260 includes a first series-coupled resistor R$_1$ and capacitor C$_1$ coupled to a first inductor L$_1$ of the hybridge rectifier circuit 230. The sensor 260 further includes a second series-coupled resistor R$_2$ and capacitor C$_2$ coupled to a second inductor L$_2$ of the hybridge rectifier circuit 230. The first and second capacitors C$_1$, C$_2$ are coupled to a stable point (e.g., a ground reference) to avoid voltage fluctuations caused by the normal AC output voltage of the transformer T$_1$. A difference between a first voltage across the first capacitor C$_1$ and a second voltage across the second capacitor C$_2$ constitutes the bias signal V$\Phi$. The bias signal V$\Phi$ may be applied to, among other things, a differential amplifier circuit to amplify the bias signal V$\Phi$ to an appropriate level, as may be required by the controller 270.

Figure 3:
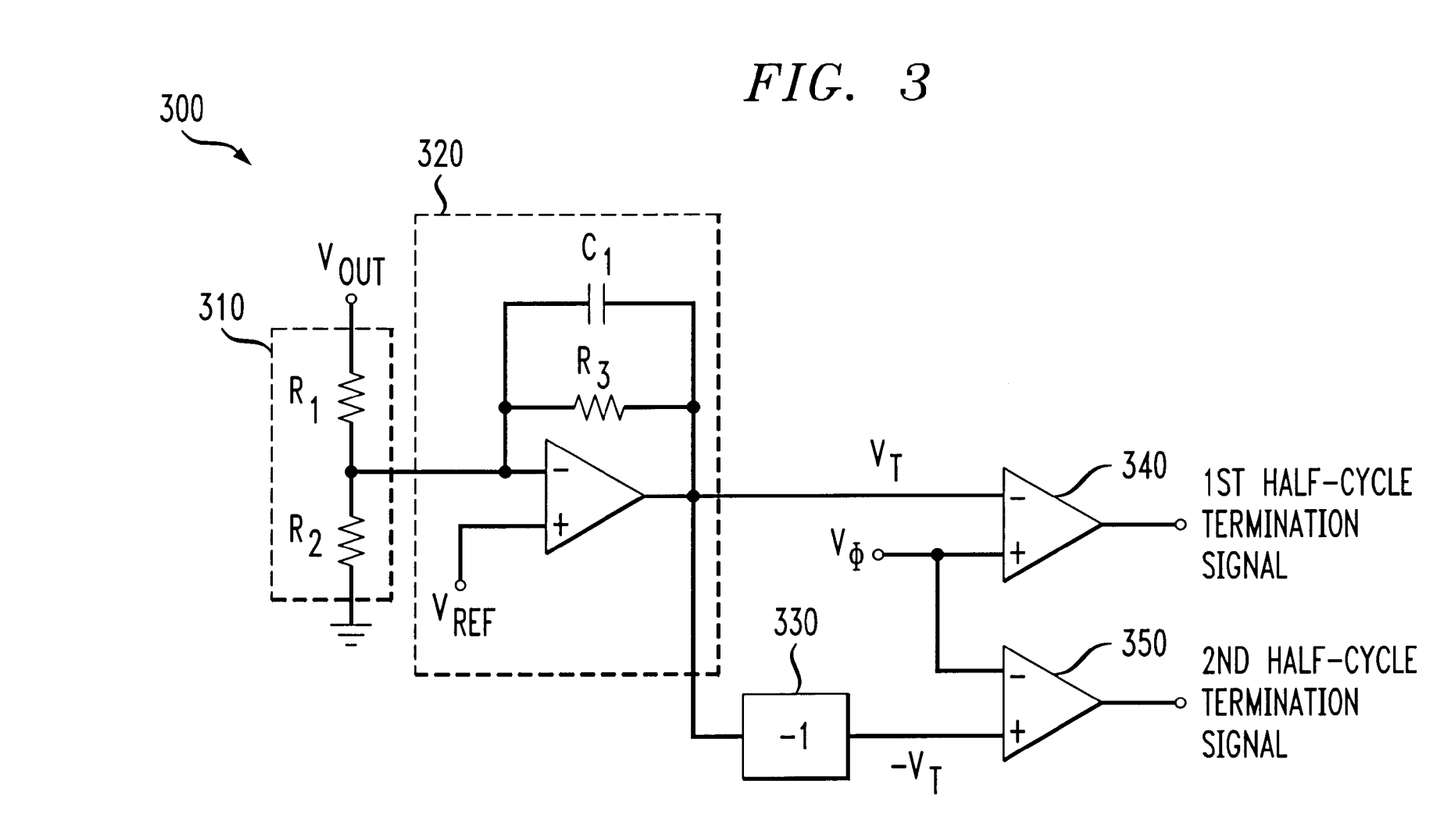
FIG. 3 illustrates a schematic diagram of a portion of a controller constructed in accordance with the principles of the present invention.

Turning now to FIG. 3, illustrated is a schematic diagram of a portion of a controller 300 constructed in accordance with the principles of the present invention. The controller 300 includes, among other things, an optional voltage divider 310 (having first and second resistors R$_1$, R$_2$) couplable to an output of a power converter, such as the power converter 100 illustrated and described with respect to FIG. 1. The voltage divider 310 may, if necessary, scale an output voltage V$_{OUT}$ of the power converter to an appropriate level.

The controller 300 further includes an error amplifier 320 (and its associated components). The error amplifier 320 compares a signal representing the output voltage V$_{OUT}$ (from the voltage divider) to a reference signal V$_{REF}$ representing a desired output voltage and develops therefrom a threshold signal V$_T$. The threshold signal V$_T$ represents a difference between the desired output voltage and the actual output voltage V$_{OUT}$. The controller 300 further includes an inverter 330 that receives the threshold signal V$_T$ and develops therefrom an inverted threshold signal –V$_T$.

The controller 300 further includes first and second comparators 340, 350. The first and second comparators 340, 350 may be coupled to a sensor, such as the sensor 160 illustrated and described with respect to FIG. 1. The first comparator 340 receives a bias signal V$\Phi$ from the sensor and compares the bias signal V$\Phi$ to the threshold signal V$_T$. An output of the first comparator may be employed to terminate, for example, a first half-cycle of an operation of a full bridge switching circuit, such as the full bridge switching circuit 110 illustrated and described with respect to FIG. 1. The first half-cycle may be defined as, for example, a portion of a switching cycle when the first and fourth controllable switches Q$_1$, Q$_4$ are conducting. The second comparator 350 receives the bias signal V$\Phi$ and compares the bias signal V$\Phi$ to the inverted threshold signal –V$_T$. An output of the second comparator may be employed to terminate a second half-cycle of an operation of a full bridge switching circuit, such as the full bridge switching circuit 110 illustrated and described with respect to FIG. 1. The second half-cycle may be defined as, for example, a portion of a switching cycle when the second and third controllable switches Q$_2$, Q$_3$ are conducting. The operation of the controller 300 will be described with respect to FIG. 4.

In the illustrated embodiment, the controller 300 employs the threshold signal V$_T$, the inverted threshold signal –V$_T$ and the bias signal V$\Phi$. In an alternative embodiment, the controller 300 may employ the bias signal V$\Phi$, an inverted bias signal –V$\Phi$ and the threshold signal. In such an embodiment, the controller 300 may employ the inverter 330 to receive the bias signal V$\Phi$ and develop therefrom the inverted bias signal –V$\Phi$. As before, the first comparator 340 receives the bias signal V$\Phi$ (in a non-inverting input) and compares the bias signal V$\Phi$ to the threshold signal V$_T$ (received at an inverting input of the first comparator 340). An output of the first comparator 340 may be employed to terminate the first half-cycle. The second comparator 350 receives the inverted bias signal –V$\Phi$ (in a non-inverting input) and compares the inverted bias signal –V$\Phi$ to the threshold signal V$_T$ (which is received at an inverting input of the second comparator 350). An output of the second comparator 350 may be employed to terminate the second half-cycle.

In another alternative embodiment, the controller 300 may sum a current signal (in ramp form), a voltage signal (in ramp form), or both the current and voltage signals, with the bias signal VΦ. By employing current mode control, voltage mode control, or a combination of current and voltage mode control, the effective input and output impedances of the power converter at high frequencies may be changed.

Figure 4:
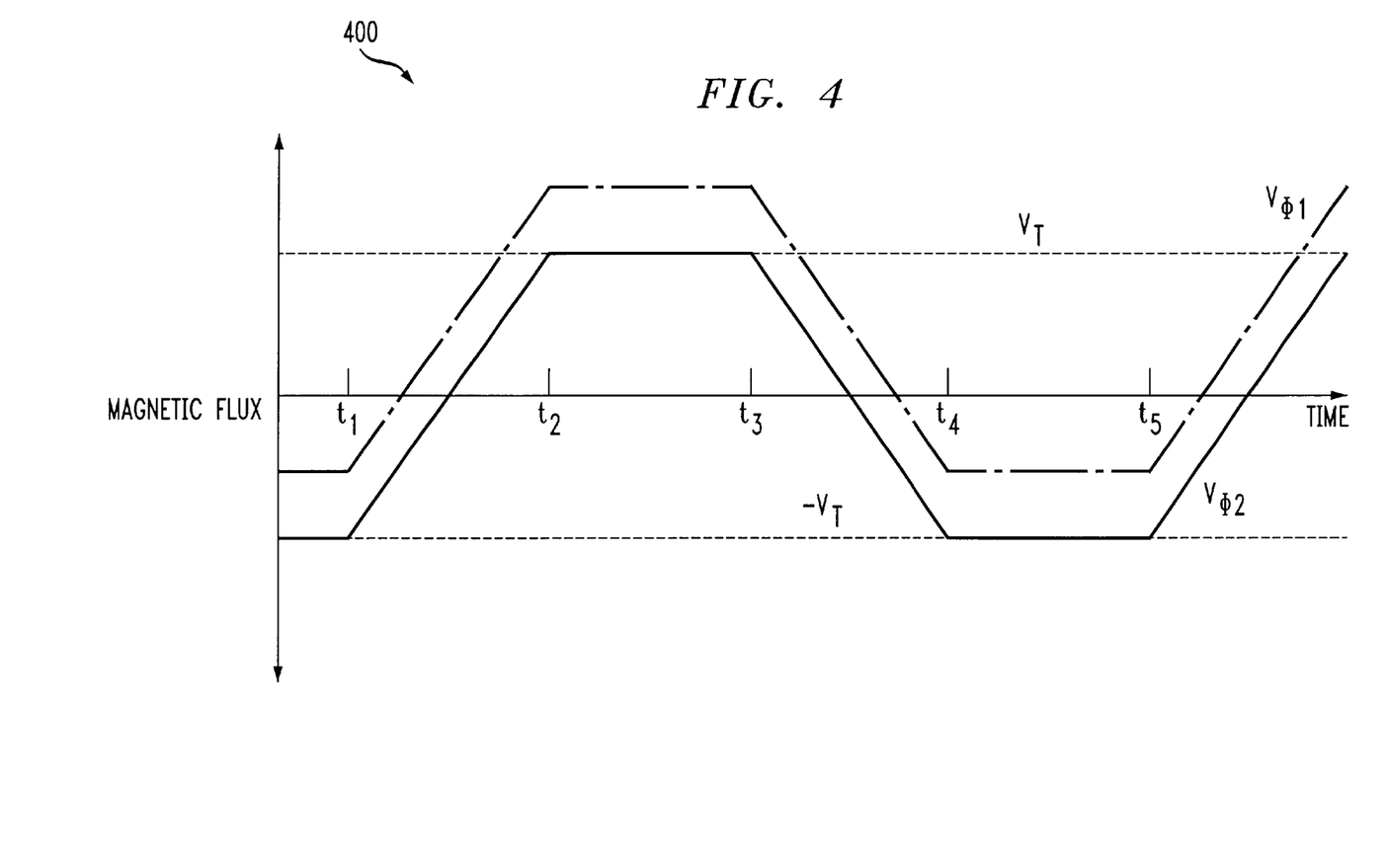
FIG. 4 illustrates a graph of a signal representing a magnetic flux exhibiting a DC bias that may be reduced by a system or method constructed in accordance with the principles of the present invention.

Turning now to FIG. 4, illustrated is a graph 400 of a signal VΦ1 representing a magnetic flux exhibiting a DC bias that may be reduced by a system or method constructed in accordance with the principles of the present invention. FIG. 4 also illustrates a signal VΦ2 representing a magnetic flux that is controlled in accordance with the principles of the present invention. As illustrated, the signal VΦ1 exhibits significantly greater excursions in a positive direction than in a negative direction.

The operation of the controller 300 will now be described with continuing reference to FIGS. 1, 3 and 4. Starting at a first time $t_1$, the first and fourth controllable switches $Q_1$, $Q_4$ are ON and the magnetic flux in the core of the transformer $T_1$ increases. The first and fourth controllable switches $Q_1$, $Q_4$ are turned OFF when the magnetic flux reaches the threshold signal $V_T$ (at the second time $t_2$). Then at a third time $t_3$, the second and third controllable switches $Q_2$, $Q_3$, are ON. The magnetic flux now decreases until it reaches the inverted threshold signal $-V_T$ (at a fourth time $t_4$). The second and third controllable switches $Q_2$, $Q_3$ are now turned OFF to maintain the magnetic flux at a constant level. Then, at a fifth time t5, the first and fourth controllable switches $Q_1$, $Q_4$ are turned ON again, repeating the cycle.

The controller 300 employs the threshold signal $V_T$ and the inverted threshold signal $-V_T$ to terminate the duty cycles of the controllable switches $Q_1$, $Q_2$, $Q_3$, $Q_4$ in a manner as described above. By terminating the duty cycles based on the threshold signal $V_T$ and the inverted threshold signal $-V_T$ a difference between the positive excursion and the negative excursion of the magnetic flux may be reduced.

The controller 300 further employs the threshold signal $V_T$ and the inverted threshold signal $-V_T$ to regulate the output voltage $V_{OUT}$ of the power converter 100. If, for example, the output voltage $V_{OUT}$ is lower than a desired output voltage, the threshold signal $V_T$ may be increased and the inverted threshold signal $-V_T$ may be decreased by a substantially equal amount to allow the output voltage $V_{OUT}$ to be increased. If, however, the output voltage $V_{OUT}$ is higher than desired, the threshold signal $V_T$ may be decreased and the inverted threshold signal $-V_T$ may be increased by an substantially equal amount to allow the output voltage $V_{OUT}$ to be decreased.

Of course, other circuits and methods for using the bias signal VΦ to alter the respective duty ratios of the controllable switches $Q_1$, $Q_2$, $Q_3$, $Q_4$ in order to reduce a DC flux level in the transformer $T_1$ are well within the spirit and scope of the present invention. The exemplary embodiments described herein are for illustration purposes only, and do not limit the scope of the invention.

Figure 5:
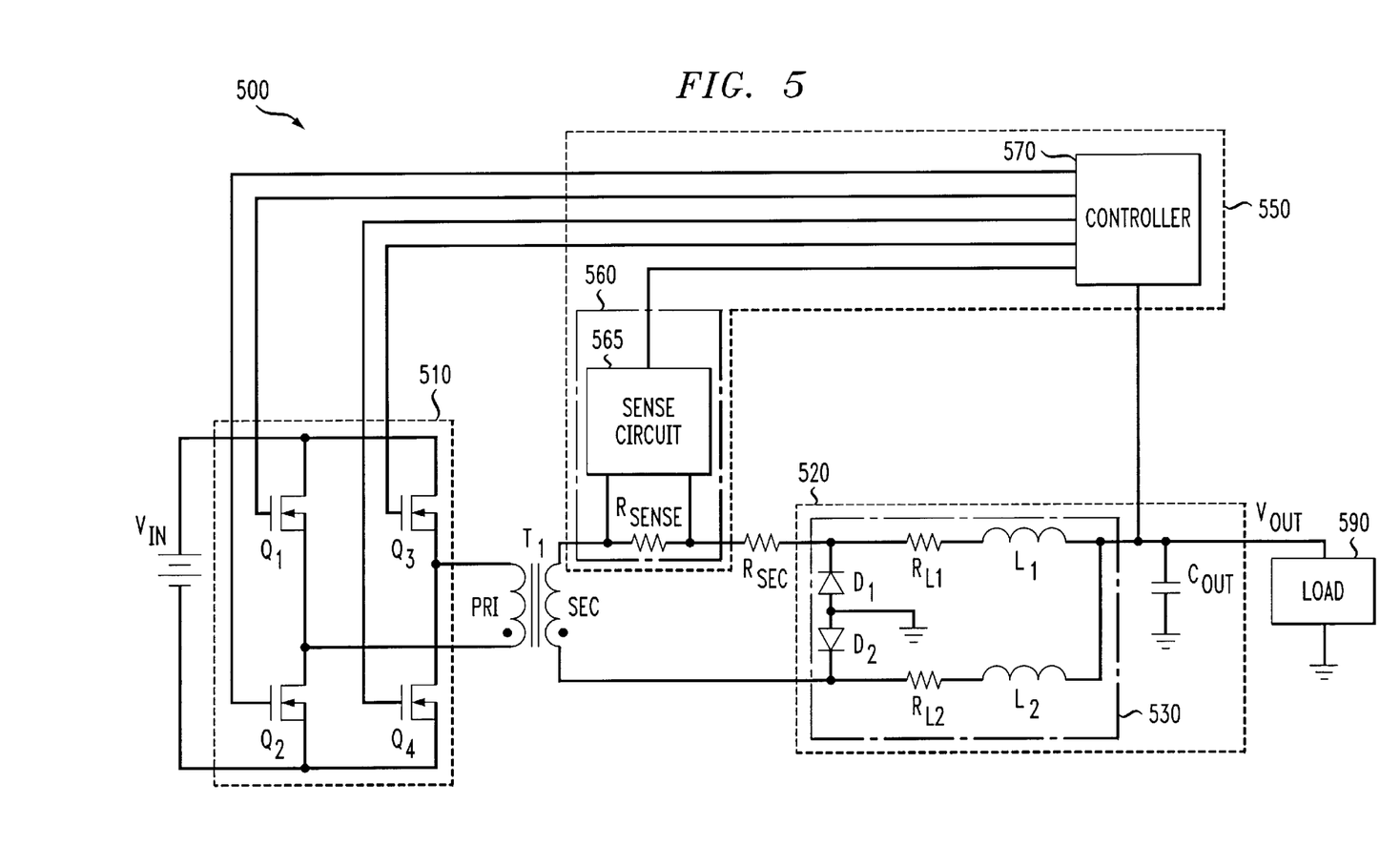
FIG. 5 illustrates a schematic diagram of another embodiment of a power converter constructed in accordance with the principles of the present invention.

Turning now to FIG. 5, illustrated is a schematic diagram of another embodiment of a power converter 500 constructed in accordance with the principles of the present invention. The power converter 500 includes a full bridge switching circuit 510, having first, second, third and fourth controllable switches $Q_1$, $Q_2$, $Q_3$, $Q_4$ coupled to a primary winding PRI of a transformer $T_1$. The first, second, third and fourth controllable switches $Q_1$, $Q_2$, $Q_3$, are intermittently switched to apply a DC input voltage $V_{IN}$, with alternating polarity, across the primary winding PRI.

The power converter 500 further includes an output stage 520, coupled across a secondary winding SEC of the transformer $T_1$, that provides an output voltage $V_{OUT}$ to a load 590. The output stage 520 includes a hybridge rectifier circuit 530 coupled to the secondary winding SEC and an output filter (output capacitor $C_{OUT}$) coupled to the hybridge rectifier circuit 530. In the illustrated embodiment, the hybridge rectifier circuit 530 includes first and second rectifying diodes $D_1$, $D_2$ coupled across the secondary winding SEC. Of course, rectifying diodes $D_1$, $D_2$ may be replaced with synchronous rectifiers as the application dictates. For a better understanding of synchronous rectifier circuits. The hybridge rectifier circuit 530 further includes first and second inductors $L_1$, $L_2$ coupled in series across the secondary winding SEC. The first and second inductors $L_1$, $L_2$ have first and second intrinsic resistances $R_{L1}$, $R_{L2}$, respectively.

The power converter 500 further includes a system 550 for reducing the DC magnetic flux bias in the transformer $T_1$. The system 550 includes a sensor 560 that develops a signal (bias signal VΦ representing a DC magnetic flux bias in the transformer $T_1$. The system 550 further includes a controller 570, coupled to the sensor 560, that operates the full bridge switching circuit 510 as a function of the bias signal VΦ thereby to reduce the DC magnetic flux bias.

In the illustrated embodiment, the sensor 560 includes a sense circuit 565 coupled across a sense resistor $R_{SENSE}$. The sense resistor $R_{SENSE}$ is coupled in series with the secondary winding SEC to allow the sense circuit 565 to sense a DC current through the secondary winding SEC. The sensor 560 may thus develop the bias signal VΦ based on the DC current through the secondary winding SEC.

The controller 570 monitors the output voltage $V_{OUT}$ and adjusts the duty cycles of the first, second, third and fourth controllable switches $Q_1$, $Q_2$, $Q_3$, $Q_4$ accordingly to regulate the output voltage $V_{OUT}$. In the illustrated embodiment, the controller 570 is coupled to the sensor 560 and receives the bias signal VΦ therefrom. The controller 570 may thus adjust duty cycles of the first, second, third and fourth controllable switches $Q_1$, $Q_2$, $Q_3$, $Q_4$ to reduce the DC magnetic flux bias in the core of the transformer $T_1$.

Figure 6:
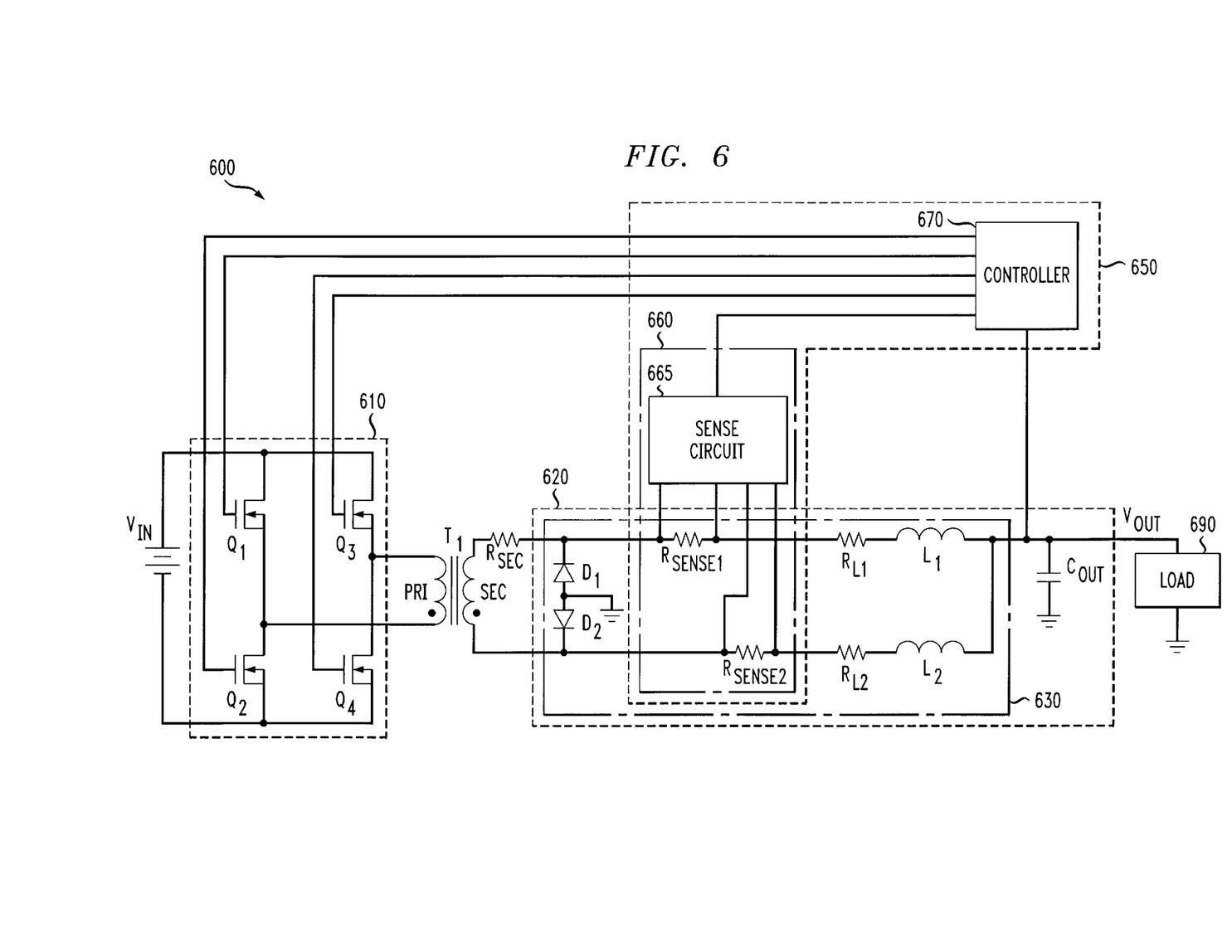
FIG. 6 illustrates a schematic diagram of yet another embodiment of a power converter constructed in accordance with the principles of the present invention.

Turning now to FIG. 6, illustrated is a schematic diagram of yet another embodiment of a power converter 600 constructed in accordance with the principles of the present invention. The power converter 600 includes a full bridge switching circuit 610, having first, second, third and fourth controllable switches $Q_1$, $Q_2$, $Q_3$, $Q_4$, coupled to a primary winding PRI of a transformer $T_1$. The first, second, third and fourth controllable switches $Q_1$, $Q_2$, $Q_3$, $Q_4$ are intermittently switched to apply a DC input voltage $V_{IN}$, with alternating polarity, across the primary winding PRI.

The power converter 600 further includes an output stage 620, coupled across a secondary winding SEC of the transformer $T_1$, that provides an output voltage $V_{OUT}$ to a load 690. The output stage 620 includes a hybridge rectifier circuit 630 coupled to the secondary winding SEC and an output filter (output capacitor $C_{OUT}$) coupled to the hybridge rectifier circuit 630. In the illustrated embodiment, the hybridge rectifier circuit 630 includes first and second rectifying diodes $D_1$, $D_2$ coupled across the secondary winding SEC. The hybridge rectifier circuit 630 further includes first and second inductors $L_1$, $L_2$ coupled in series across the secondary winding SEC. The first and second inductors $L_{L1}$, $R_{L2}$ have first and second intrinsic resistances $R_{L1}$ $RL_2$, respectively.

A core of the transformer $T_1$ is subject to saturation due to a DC magnetic flux bias resulting from, among other things, a difference in the first and second intrinsic resistances $R_{L1}$, $R_{L2}$ of the first and second inductors $L_1$, $L_2$. Unequal intrinsic resistances $R_{L1}$, $R_{L2}$ may result in an unequal division of current (a current mismatch) between the first and second inductors $L_1$, $L_2$. A first DC voltage drop across the first intrinsic resistance $R_{L1}$ may be unequal to a second DC voltage drop across the second intrinsic resistance $R_{L2}$, resulting in a DC bias voltage that is applied directly across the secondary winding SEC. Since the transformer $T_1$ is unable to transmit a DC signal between the primary and secondary windings PRI, SEC, the DC bias voltage may cause the magnetic flux to exhibit a DC bias.

The current mismatch in the first and second inductors $L_1$, $L_2$, which causes the DC magnetic flux bias in the transformer $T_1$, may be estimated by employing the following equation:

$$\Delta I/I \approx k * \Delta R/R$$

wherein $\Delta I$ is a mismatch in the DC inductor currents; $\Delta R$ is a mismatch in the first and second intrinsic resistances $R_{L1}$, $R_{L2}$; I is the nominal DC current in each of the first and second inductors $L_1$, $L_2$; R is the nominal intrinsic resistance of the first and second inductors $L_1$, $L_2$; and k is a proportionality factor, which may be about 0.65.

Even if the first and second inductors $L_1$, $L_2$, were initially resistance-matched, a modest mismatch in their relative operating temperatures may result in the first and second intrinsic resistances $R_{L1}$, $R_{L2}$ being unequal. The temperature difference may be a consequence of, among other things, a difference in airflow across the first and second inductors L1, L2 resulting from a particular design.

The power converter 600 further includes a system 650 for reducing the DC magnetic flux bias in the transformer $T_1$. The system 650 includes a sensor 660 that develops a signal (bias signal VΦ) representing a DC magnetic flux bias in the transformer $T_1$. The system 650 further includes a controller 670, coupled to the sensor 660, that operates the full bridge switching circuit 610 as a function of the bias signal VΦ thereby to reduce the DC magnetic flux bias.

In the illustrated embodiment, the sensor 660 includes a sensing circuit 665 and first and second sense resistors $R_{SENSE1}$, $R_{SENSE2}$. The first sense resistor $R_{SENSE1}$ is coupled in series with the first inductor $L_1$ while the second sense resistor $R_{SENSE2}$ is coupled in series with the second inductor $L_2$. The first and second sense resistors $R_{SENSE1}$, $R_{SENSE2}$ sense DC currents in the first and second inductors $L_1$, $L_2$, respectively. The sensor 660 may thus develop the bias signal VΦ based on a difference between the DC currents in the first and second inductors $L_1$, $L_2$.

The controller 670 monitors the output voltage $V_{OUT}$ and adjusts the duty cycles of the first, second, third and fourth controllable switches $Q_1$, $Q_2$, $Q_3$, $Q_4$ accordingly to regulate the output voltage $V_{OUT}$. In the illustrated embodiment, the controller 670 is coupled to the sensor 660 and receives the bias signal VΦ therefrom. The controller 670 may thus adjust duty cycles of the first, second, third and fourth controllable switches $Q_1$, $Q_2$, $Q_3$, $Q_4$ to reduce the DC magnetic flux bias in the core of the transformer $T_1$.

Those skilled in the art should understand that the previously described embodiments of the system and method for reducing DC magnetic flux bias in a transformer of a power converter are submitted for illustrative purposes only and that other embodiments are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. For a better understanding of power converters, see *Modern DC-to-DC Switchmode Power Converter Circuits*, by Rudolph P. Severns and Gordon Bloom, Van Nostrand Reinhold Company, New York N.Y. (1985) and Principles of Solid-State Power conversion, by Ralph E. Tarter, Howard W. Sam & Co., Inc., Indianapolis, Ind. (1985), which are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. For use with a power converter having a full bridge switching circuit coupled across a primary winding of a transformer and a hybridge rectifier circuit coupled across a secondary winding of said transformer, said transformer subject to a DC magnetic flux bias as a result of an imbalance in said hybridge rectifier circuit, a system for reducing said DC magnetic flux bias in said transformer, comprising:
   a sensor configured to develop a signal representing said DC magnetic flux bias in said transformer; and
   a controller, coupled to said sensor, configured to operate said full bridge switching circuit as a function of said signal thereby to reduce said DC magnetic flux bias.

2. The system as recited in claim 1 wherein said sensor comprises an integrating differential operational amplifier.

3. The system as recited in claim 1 wherein said sensor comprises a series-coupled resistor and capacitor coupled to an inductor of said hybridge rectifier circuit.

4. The system as recited in claim 1 wherein said sensor comprises a sense resistor, coupled in series with said secondary winding, configured to sense a DC current in said secondary winding, said sensor developing said signal based on said DC current.

5. The system as recited in claim 1 wherein said sensor comprises first and second sense resistors respectively coupled to first and second inductors of said hybridge rectifier circuit and configured to sense DC currents in said first and second inductors, said sensor developing said signal based on a difference between said DC currents.

6. The system as recited in claim 1 wherein said controller is configured to adjust a duty cycle of controllable switches associated with said full bridge switching circuit.

7. The system as recited in claim 1 wherein said controller is configured to reduce a difference between a positive excursion and a negative excursion of a magnetic flux in said transformer.

8. The system as recited in claim 1 wherein said controller is configured to employ said signal to terminate a duty cycle of a controllable switch associated with said full bridge switching circuit.

9. For use with a power converter having a full bridge switching circuit coupled across a primary winding of a transformer and a hybridge rectifier circuit coupled across a secondary winding of said transformer, said transformer subject to a DC magnetic flux bias as a result of an imbalance in said hybridge rectifier circuit, a method for reducing said DC magnetic flux bias in said transformer, comprising:
   developing a signal representing said DC magnetic flux bias in said transformer; and
   operating said full bridge switching circuit as a function of said signal thereby to reduce said DC magnetic flux bias.

10. The method as recited in claim 9 wherein said developing is performed by an integrating differential operational amplifier.

11. The method as recited in claim 9 wherein said developing is performed by a series-coupled resistor and capacitor coupled to an inductor of said hybridge rectifier circuit.

12. The method as recited in claim 9 wherein said developing said signal comprises sensing a DC current in said secondary winding with a sense resistor coupled in series with said secondary winding, said signal being based on said DC current.

13. The method as recited in claim 9 wherein said developing said signal comprises sensing DC currents in first and second inductors of said hybridge rectifier circuit with first and second sense resistors respectively coupled to said first and second inductors, said signal being based on a difference between said DC currents.

14. The method as recited in claim 9 wherein said operating comprises adjusting a duty cycle of controllable switches associated with said full bridge switching circuit.

15. The method as recited in claim 9 wherein said operating comprises reducing a difference between a positive excursion and a negative excursion of a magnetic flux in said transformer.

16. The method as recited in claim 9 wherein said operating comprises terminating a duty cycle of a controllable switch associated with said full bridge switching circuit.

17. A power converter, comprising:
   a transformer having a primary winding and a secondary winding;
   a full bridge switching circuit coupled across said primary winding;
   a hybridge rectifier circuit coupled across said secondary winding, said transformer subject to saturation due to a DC magnetic flux bias therein as a result of an imbalance in said hybridge rectifier circuit; and
   a system for reducing said DC magnetic flux bias, including:
      a sensor configured to develop a signal representing said DC magnetic flux bias in said transformer, and
      a controller, coupled to said sensor, that operates said full bridge switching circuit as a function of said signal to reduce said DC magnetic flux bias thereby substantially preventing said saturation.

18. The power converter as recited in claim 17 wherein said sensor comprises an integrating differential operational amplifier.

19. The power converter as recited in claim 17 wherein said sensor comprises a series-coupled resistor and capacitor coupled to an inductor of said hybridge rectifier circuit.

20. The power converter as recited in claim 17 wherein said sensor comprises a sense resistor, coupled in series with said secondary winding, that senses a DC current in said secondary winding, said sensor developing said signal based on said DC current.

21. The power converter as recited in claim 17 wherein said sensor comprises first and second sense resistors, respectively coupled to first and second inductors of said hybridge rectifier circuit, that sense DC currents in said first and second inductors, said sensor developing said signal based on a difference between said DC currents.

22. The power converter as recited in claim 17 wherein said controller adjusts a duty cycle of controllable switches associated with said full bridge switching circuit.

23. The power converter as recited in claim 17 wherein said controller reduces a difference between a positive excursion and a negative excursion of a magnetic flux in said transformer.

24. The power converter as recited in claim 17 wherein said controller employs said signal to terminate a duty cycle of a controllable switch associated with said full bridge switching circuit.

* * * * *